United States Patent
Huessler

(10) Patent No.: US 6,981,816 B2
(45) Date of Patent: Jan. 3, 2006

(54) APPARATUS FOR RELEASABLY INTERCONNECTING STRUCTURAL COMPONENTS HAVING A ROTATIONAL SYMMETRY

(75) Inventor: Walter Huessler, Stuhr (DE)

(73) Assignee: EADS Space Transporation GmbH, Bremen (DE)

( * ) Notice: Subject to any disclaimer, the term of this patent is extended or adjusted under 35 U.S.C. 154(b) by 120 days.

(21) Appl. No.: 10/717,011

(22) Filed: Nov. 18, 2003

(65) Prior Publication Data

US 2004/0156673 A1 Aug. 12, 2004

(30) Foreign Application Priority Data

Jan. 18, 2003 (DE) .......................................... 103 01 783

(51) Int. Cl.
*F16B 2/08* (2006.01)

(52) U.S. Cl. ........................ 403/223; 403/291; 403/373; 403/398; 403/DIG. 4; 403/DIG. 7; 403/DIG. 9; 403/DIG. 14

(58) Field of Classification Search ................. 403/373, 403/374.2, 374.3, 374.5, 398, 223, 220, 291, 403/DIG. 4, DIG. 7, DIG. 9, DIG. 14
See application file for complete search history.

(56) References Cited

U.S. PATENT DOCUMENTS 4,128,921 A 12/1978 Heinze et al.
5,157,816 A 10/1992 Huessler
5,411,349 A 5/1995 Hornung et al.
6,588,968 B2 7/2003 Huessler et al.

FOREIGN PATENT DOCUMENTS

| DE | 2655772 | 12/1976 |
|---|---|---|
| DE | 3727448 | 8/1987 |
| DE | 4221525 | 7/1992 |
| DE | 10033093 | 7/2000 |

*Primary Examiner*—Christopher J. Novosad
(74) *Attorney, Agent, or Firm*—W. F. Fasse; W. G. Fasse

(57) ABSTRACT

Two structural components having a rotational symmetry relative to a central longitudinal axis, are releasably connected to each other by a clamping mechanism which engages two interface rings secured to the respective structural component. The clamping mechanism is formed by tensioning elements (5) held together by at least one, preferably two straps (1, 2). A lock (15) with two hinged tensioning levers holds the strap or straps releasably together. For this purpose each strap end is journalled by a journal bolt to the tensioning lever (18, 19). Locking elements (25, 26, 28, 30) hold the tensioning lever (18, 19) in a locked position in the lock. An electromagnetic drive or the like unlocks the tension levers for releasing the tensioning strap or straps, whereby the opening motion of the tensioning levers is retarded or delayed by one or more springs in a controlled manner to avoid or at least optimally reduce the triggering of harmful vibrations and the introduction of undesirable loads in the components being released.

18 Claims, 4 Drawing Sheets

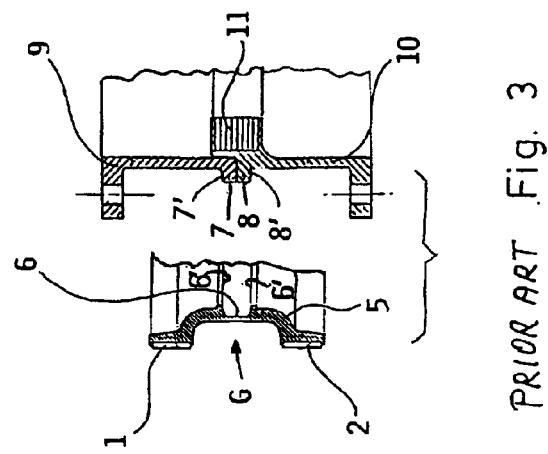
PRIOR ART Fig. 3
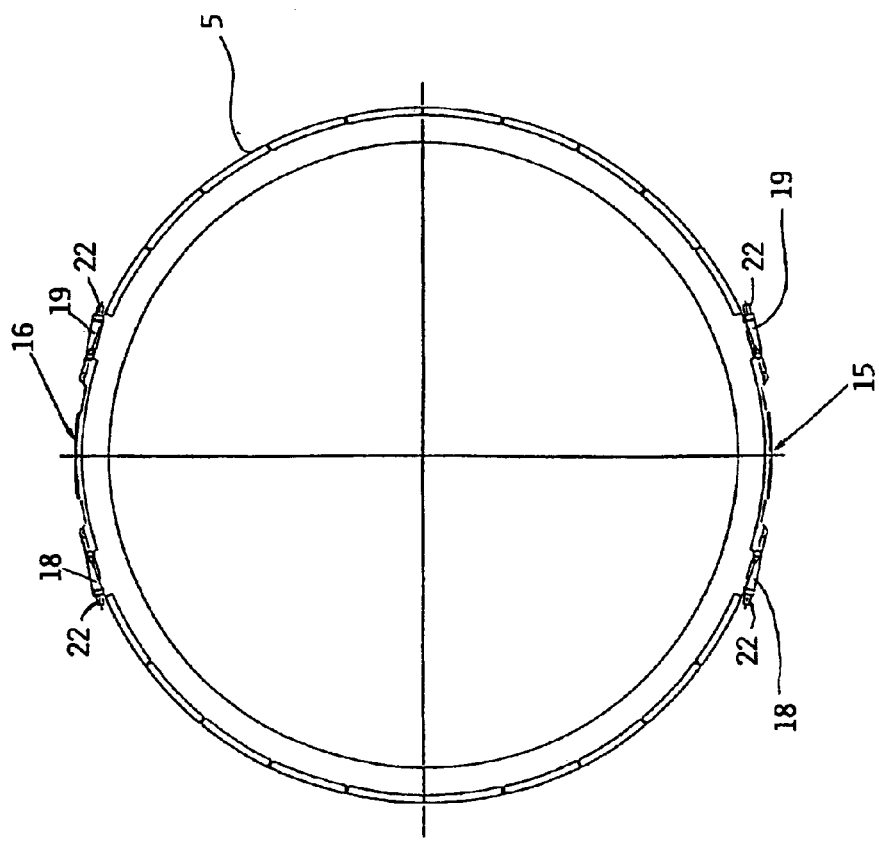
PRIOR ART Fig. 2

APPARATUS FOR RELEASABLY INTERCONNECTING STRUCTURAL COMPONENTS HAVING A ROTATIONAL SYMMETRY

CROSS-REFERENCE TO RELATED U.S. PATENT

This application is related to U.S. Pat. No. 6,588,968 B2, issued on Jul. 8, 2003, based on U.S. Ser. No. 09/801,174, filed Mar. 5, 2001. The entire disclosure of said U.S. Patent is incorporated herein by reference.

PRIORITY CLAIM

This application is based on and claims the priority under 35 U.S.C. §119 of German Patent Application 103 01 783.6, filed on Jan. 18, 2003, the entire disclosure of which is incorporated herein by reference.

FIELD OF THE INVENTION

The invention relates to a clamping mechanism for releasably interconnecting structural components of rotational symmetry such as cylindrical or conical bodies. An example is the connection of a payload to a carrier rocket. The clamping mechanism forms a tensioning ring which is capable of releasing one structural component from the other structural component without completely opening the ring.

BACKGROUND INFORMATION

Such a clamping mechanism encircles the structural components to be interconnected in a clamping plane or planes with a plurality of clamping elements that are held together by at least one, preferably two tensioning members such as belts, straps, cables or the like. The clamping elements are arranged on the radially inwardly facing surface of the tensioning member or members. In the operating position the clamping elements engage flanges of the structural components. The at least one tensioning member such as a belt forms at its ends loops or eyes that extends around bolts which in turn are positioned perpendicularly to a tensioning force that extends circumferentially around the structural components, or rather around the above mentioned tensioning plane or planes of these components. Two such bolts which extend in parallel to a longitudinal system axis are interconnected by a tensioning assembly that includes two tensioning levers which releasably interconnect the two bolts. The tensioning levers are hinged to a mounting and carry the tensioning bolts in such a way that moving the tensioning levers into a locking position displaces the tensioning bolts in a tensioning direction. The tensioning assembly further includes a locking mechanism which assures that the two tensioning levers cannot be opened unintentionally.

An apparatus of the type described above is disclosed in U.S. Pat. No. 6,588,968 B2 which corresponds to German Patent Publication DE 100 33 093. The known clamping mechanism is used for interconnecting a payload with an end stage of a carrier rocket. When the rocket and payload reach the target orbit, the tensioning member or members are released.

Other clamping mechanisms used for this purpose are known as so-called Marman clamping connections. One such connection is, for example, disclosed in German Patent Publication DE-OS 2,655,772, which corresponds to U.S. Pat. No. 4,128,921. A "Marman" tensioning connector also comprises clamping elements on the inner surface of a tensioning belt or strap. The clamping elements on the inwardly facing surface of the tensioning belt or strap are provided with conical recesses which cooperate with correspondingly shaped flanges of interface rings forming part of the structural components to be interconnected. When the two structural components are to be separated, the tensioning belts or straps with their clamping elements are pulled off by a pyrotechnically controlled explosion, whereby the structural components separate from one another.

German Patent Publication 37 27 448 C2, which corresponds to U.S. Pat. No. 5,157,816 and German Patent Publication DE 42 21 525, which corresponds to U.S. Pat. No. 5,411,349 A1 disclose clamping mechanisms for the same purpose. All known mechanisms are equipped with belts or straps which in turn carry on their inwardly facing surfaces clamping elements provided with conical recesses for the engagement of respectively formed flanges or interface rings of the components to be interconnected.

Since the opening of the tensioning or clamping mechanism is performed by a pyrotechnical explosion, the separation takes place within microseconds so that the tension release must also take place in such a short time duration. The clamping elements must also be separated from the flanges or interface rings in such a short duration. As a result, very substantial dynamic loads may be introduced into the structural components. Such substantial loads have frequencies that reach from low frequencies to high frequencies which can trigger respective vibrations in the structural components. Further, these loads may be imposed on areas of the structural components above and below the separation systems. The low to high frequency loads are triggered by the pyrotechnical separation in the form of resulting shock waves and by the energy release that takes place due to the release of the tensioning forces in the straps or belts. These dynamic loads propagate into the neighboring components and systems of the rocket and of the payload.

In order to avoid such introduction of dynamic loads into the structural components, systems have been suggested in the above mentioned German Patent Publication DE 42 21 525 A1 and in U.S. Pat. No. 6,588,968 B2, which make possible an opening operation that is controlled and slowed down. Particularly U.S. Pat. No. 6,588,968 B2 discloses a mechanism that drastically reduces the above mentioned dynamic loads since it avoids the triggering of such loads by not using a pyrotechnical separation force and because it simultaneously provides a slow down that is 30 to 50 times slower compared to other known mechanism of this type. Nevertheless, there is room for improvement even in the mechanism according to U.S. Pat. No. 6,588,968 B2 with regard to the suppression of the triggering of resonance frequencies or low frequency vibrations in the structural components when the strapping or clamping mechanism is released.

OBJECTS OF THE INVENTION

In view of the foregoing it is the aim of the invention to achieve the following objects singly or in combination:

to improve a clamping mechanism, for example as disclosed in U.S. Pat. No. 6,588,968 B2, in such a way that an adjustable or selectable optimal duration of the opening time of the clamping mechanism is assured;

to avoid or reduce the introduction of dynamic mechanical loads in the structural components by their disconnection to thereby prevent or at least substantially reduce vibrations in the structural components;

to precisely locate the force time gradient within the time duration of the tension release operation, particularly at the end of the tension release operation to thereby achieve a substantial further reduction in the triggering of vibrations; and to assure that the opening operation can be accomplished with a small energy or force input and to cause the entire opening function to take place within a controlled time duration.

SUMMARY OF THE INVENTION

The invention improves a clamping mechanism for releasably interconnecting two structural components having radially outwardly reaching clamping surfaces of rotational symmetry. The clamping mechanism comprises a plurality of clamping elements and at least one tensioning member which holds the clamping elements together. The clamping elements have a radially inwardly facing clamping groove adapted for cooperation with the clamping surfaces of said structural components. The at least one tensioning member has a first end with a first connecting eye and a second end with a second connecting eye. At least one tensioning assembly is connected to the first and second eyes and comprises a mounting, first and second tensioning levers and two separate hinges which operatively hinge the first and second tensioning levers to said mounting for tensioning the at least one tensioning member such as a belt or strap. A locking mechanism is secured to the mounting between said first and second tensioning levers for locking first and second tensioning levers in a tensioned position. The first tensioning lever has a first guide. A first journal bolt secures the first connecting eye to said first tensioning lever, specifically to the first guide for movement relative to said first tensioning lever. The second tensioning lever has a second guide. A second journal bolt secures the second connecting eye to said second tensioning lever, specifically to the second guide for movement relative to said second tensioning lever. According to the invention retarding or delay elements are operatively interposed between the mounting or a fixed point and each tensioning lever of the first and second tensioning levers for slowing down the opening motion of the first and second tensioning levers to thereby control the time duration of the opening function and prevent or at least substantially reduce the triggering of vibrations in the components that are being separated from each other.

The apparatus according to the invention permits an adaptation of the opening time duration and of the force time gradient in an optimal manner to thereby optimally reduce the triggering of undesirable loads by the release of the clamping mechanism. A controlled, gradual release of the tension force stored in the clamping mechanism prevents or greatly reduces the triggering of harmful vibrations. This important advantage is achieved according to the invention by retarding spring elements which slow down the opening motion and which shift the force time gradient of the tensioning force release toward the end of the slowed down opening motion. The retarding elements are preferably leaf springs or spiral springs or helical springs which are positioned to influence the opening motion of the tensioning levers by imposing a counter moment against the opening moment of the respective tensioning lever. By properly selecting the structural and functional characteristics of the retarding elements, particularly the springs in the form of leaf springs or helical or spiral springs, it is possible to control the release function and thereby optimize the release function by preventing uncontrolled motions of the clamping mechanism. For example, by selecting the proper dimensions and/or the material of the retarding springs the desired spring characteristics are obtained. The effectiveness of the retarding elements can be further selected by the proper positioning of the retarding elements, whereby the starting angle of the, counter-moment imposed by the retarding elements can be selected. More specifically, the time of the first contact between the tensioning lever on its way into the fully opened position and the respective retarding element can be selected by the positioning of the retarding element. The position of the retarding elements relative to the tensioning lever to be retarded advantageously influences the effectiveness of the retarding element on the respective opening motion. It has been found that particularly the triggering of low frequency vibrations can be further reduced significantly in this manner. Further, a delayed contact between the retarding element and the tensioning lever on its way into the released position does not necessarily increase the duration of the opening or tension release motion, but rather reduces the force time gradient at the end of the tension release function. Preferably the contact between the retarding element and the respective tensioning lever takes place with a contact pin that is secured to the tensioning lever and extends from the respective tensioning lever in such a direction and position that the contact pin must encounter the retarding element or elements when the tensioning lever has been released and moves toward the fully open position. This reduction in the force time gradient toward the end of the release function achieves a further substantial reduction in the triggering of vibrations and the thereby caused undesirable dynamic responses of the neighboring structural components that have been released by the opening of the clamping mechanism.

According to the invention the clamping mechanism is first tightened by moving the tensioning levers toward each other into the locked position. Thereafter, the retarding elements in the form of leaf springs or spiral or helical springs are installed as will be described in more detail below. The tensioning belt or belts are unlocked for separating the two structural components from one another. In response to the unlocking the tensioning levers move out of the locked position into the open position in response to the tension stored in the tension members, whereby the diameter of the ring formed by the tensioning members is increased. The ring is not completely opened so that a closed ring remains. The triggering of the opening motion can be accomplished with a small energy or force and the entire opening function or sequence of the tension lever motions into the open position takes place in a controlled manner within a defined time duration as determined by the present retarding elements.

BRIEF DESCRIPTION OF THE DRAWINGS

In order that the invention may be clearly understood, it will now be described in connection with example embodiments thereof, with reference to the accompanying drawings, wherein:

FIG. 2 is a top plan view of the clamping mechanism in its opened state, wherein the two spaced and hinged tension levers point away from each other as disclosed in U.S. Pat. No. 6,588,968 B2;

FIG. 3 shows a sectional view along section line III—III in FIG. 1, whereby a clamping element is shown radially spaced from interface rings or flanges of structural components to be releasably interconnected;

DETAILED DESCRIPTION OF A PREFERRED EXAMPLE EMBODIMENT AND OF THE BEST MODE OF THE INVENTION

Figure 1:
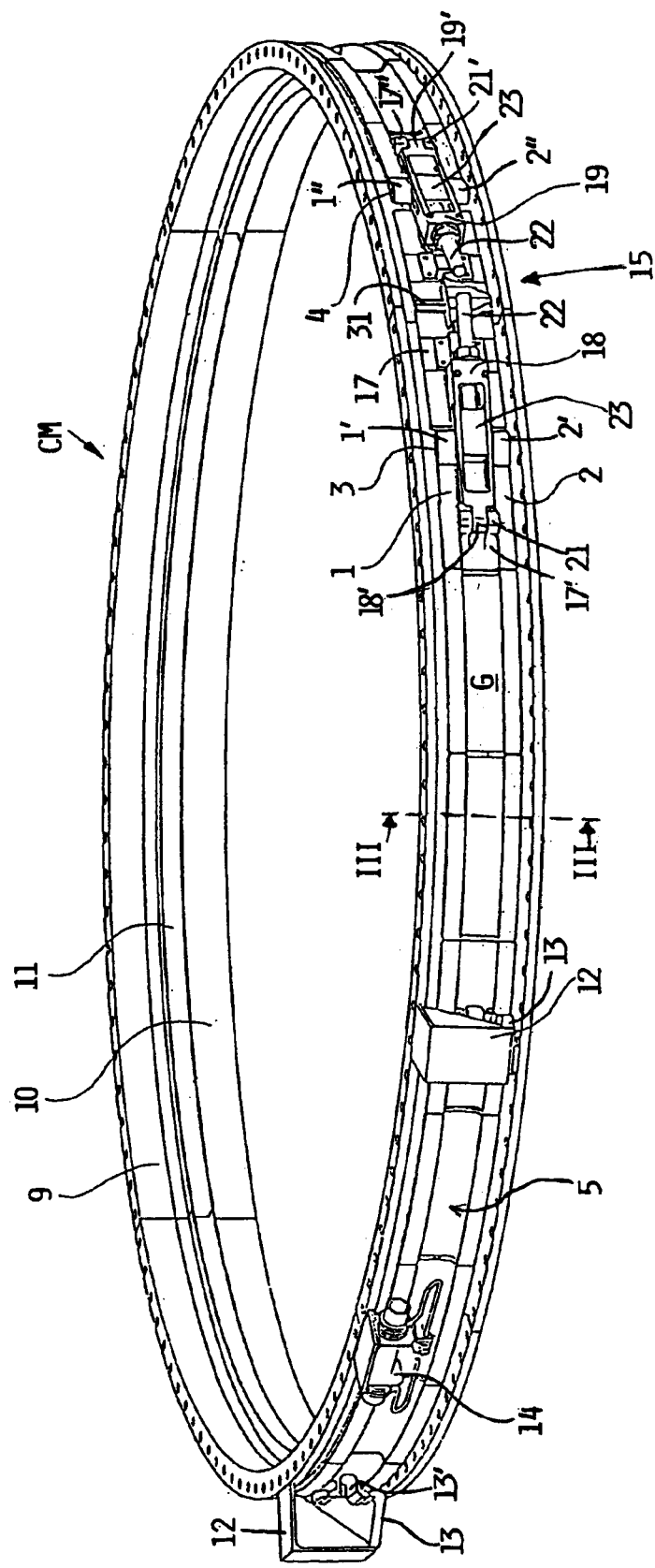
FIG. 1 is a perspective view of a strapping or clamping mechanism as disclosed in U.S. Pat. No. 6,588,968 B2, showing two tensioning straps held together by at least one tensioning assembly that includes a locking mechanism and a mounting with two spaced hinged tensioning levers pointing toward each other in their tensioned and locked position.

In order to provide a background context for the understanding of the invention, FIGS. 1, 2 and 3 of U.S. Pat. No. 6,588,968 B2 are now described first.

The perspective view of FIGS. 1, 2 and 3 shows a conventional clamping mechanism CM as disclosed in U.S. Pat. No. 6,588,968 B2 which describes a permanently closed ring that is formed of a plurality of clamping elements 5 circumferentially distributed around the ring shown in a tensioned and locked condition. The diameter of the permanently closed ring can be reduced for locking and increased for unlocking. The clamping elements 5 are held together by two tensioning members 1, 2 such as straps, tapes, belts or cables which are spaced from each other in the vertical or axial direction. The axial direction is defined as the central longitudinal axis of the structural components (not shown) to be releasably clamped together. The strap 1 has an eye 1' at one end and an eye 1" at the other strap end. The strap 2 has an eye 2' at one end and an eye 2" at the other strap end. A journal bolt 3 passes through the eyes 1' and 2' at one end of the two straps 1 and 2 arranged and parallel to each other. A further journal bolt 4 passes through the respective eyes 1" and 2" at the other end of the two straps 1 and 2. These journal bolts 3 and 4 operatively connect the strap ends or eyes to a respective tensioning lever 18 and 19 to form a ring structure as will be described in more detail below. The journal bolts 3 and 4 extend in parallel to each other and in parallel to the above defined central longitudinal axis.

All of the clamping elements 5 that are facing radially inwardly from the tensioning members 1 and 2 are of identical construction. FIG. 3 shows a section through a clamping element 5 and through interface rings 9 and 10 which are connected to the structural components not shown. Each clamping element 5 has a flat ring surface preferably two flat ring surfaces facing radially outwardly and into contact with the tensioning members 1, 2. Each clamping element 5 also has an outwardly facing contoured groove G and a radially inwardly facing contoured clamping channel 6 having preferably slanted conical walls 6' facing each other across the clamping channel 6. The interface ring 9 has a flange 7 with a conical surface 7'. The interface ring 10 has a flange 8 with a conical surface 8'. These conical surfaces 7' and 8' fit into the clamping channel 6 when the straps 1 and 2 are tightened by the tensioning levers 18, 19 of the tensioning assembly which also includes a mounting 17, and a locking mechanism 15 or 16 for locking the levers 18, 19 in a tensioned position for maintaining the two structural components clamped together until the locking mechanisms are released. One of the interface rings 9 or 10 is provided with a radially inwardly facing reinforcing ring 11, for example the ring 11 is part of the interface ring 10. Assuming the ring 10 is secured to the end stage of a carrier rocket, the ring 11 will provide a stop flange for the insertion of the payload into the ring 9.

FIG. 1 also shows that the tensioning members 1, 2 are held properly spaced from one another in the axial direction by belt clamps 12 having a spring biased arm 13 that engages with its bent free end a hook 13' secured to at least certain of the clamping elements 5. A so-called pull off spring mechanism 14 is part of at least one of the tensioning members 1, 2 for removing the tensioning member from the ring structure. FIG. 2 shows the ring structure with two sections interconnected by two pairs of tensioning levers 18, 19, two locking mechanisms 15, 16 and two pairs of tensioning screws 22.

FIG. 1 also shows that each of the journal bolts 3 and 4 is journalled in a respective tensioning lever 18, 19 of the tensioning assembly that includes the locking mechanism 15 or 16 for locking the tensioning levers in a tensioned position. The locking mechanism 16 shown in FIG. 2 is of identical construction as the locking mechanism 15. Therefore only one of these locking mechanisms will be described in detail. Each tensioning assembly with its locking mechanism 15 or 16 comprises a mounting 17 carrying two hinge blocks 17' and 17" as seen in FIG. 1. The mounting 17 has a curvature and radially inwardly facing contour fitting into the radially outwardly facing groove or contour G formed in the clamping elements 5 shown in FIG. 3, whereby the mounting 17 helps spacing the straps 1 and 2 axially from each other. The mounting 17 and its hinge blocks 17', 17" also fit between the axial end flanges of the interface rings 9, 10. The above mentioned two tensioning levers 18 and 19 are spaced from each other circumferentially and are hinged to the hinge blocks 17' and 17", respectively. A hinge pin 21 hinges a first end 18' of the tensioning lever 18 to the hinge block 17'. A second hinge pin 21' hinges a first end 19' of the tensioning lever 19 to the hinge block 17". The mounting 17, the tensioning levers 18 and 19, the locking mechanism 15, the hinge blocks 17', 17" and the hinge pins 21, 21' together form the main components of the tensioning assembly.

Figure 4:
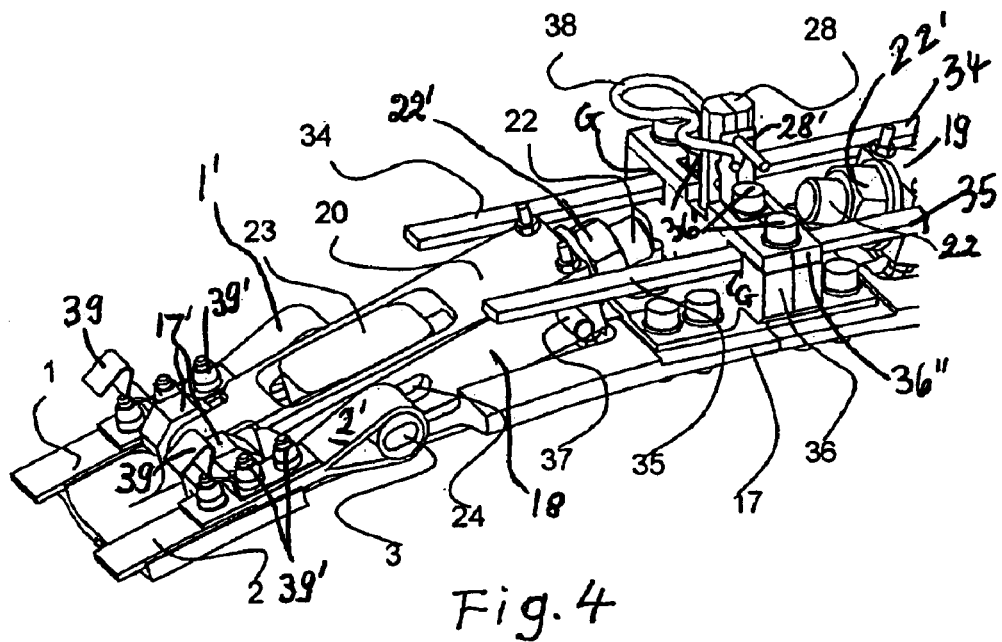
FIG. 4 is a perspective view of the tensioning and locking assembly showing the tensioning levers in a closed and locked position and including opening motion retarding leaf springs according to the invention already installed.
Figure 5:
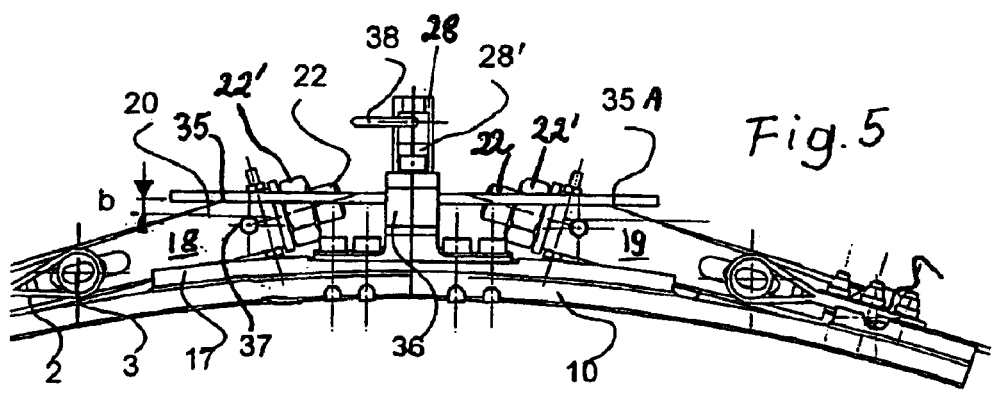
FIG. 5 is a side view of the apparatus according to FIG. 4, illustrating the position of the leaf springs according to the invention relative to the respective tensioning levers.
Figure 6:
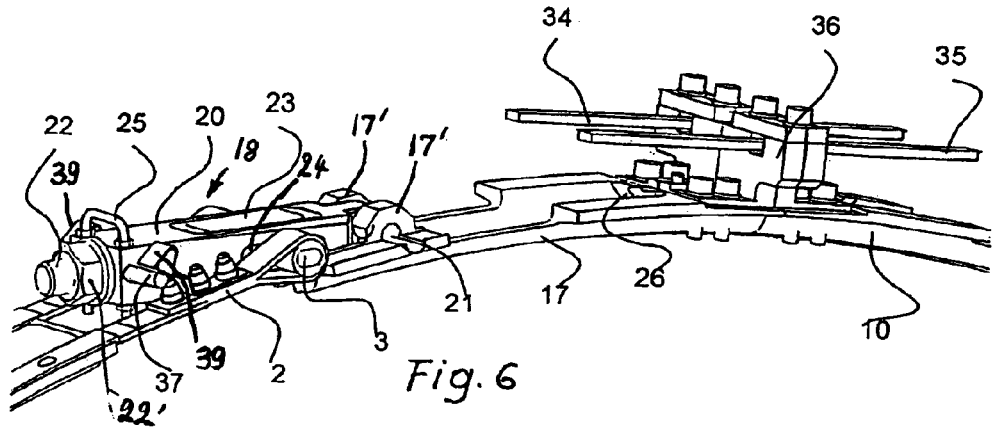
FIG. 6 is a perspective illustration of the apparatus after the opening motion has been completed and after the leaf springs have served their purpose.

FIGS. 4, 5 and 6 illustrate one embodiment of the present invention. The eyes 1' and 2' of the tensioning members 1 and 2 are journaled to the tensioning lever 18 by the same journal bolt 3. The eyes 1" and 2" at the opposite ends of the straps 1, 2 are journaled to the tensioning lever 19 by the journal bolt 4 as shown in FIG. 1 but not in FIG. 4. The tensioning levers 18 and 19 are spaced from each other in the circumferential direction along the mounting 17. Only the tensioning lever 18 will be described in detail. The tensioning lever 19 is of the same mirror symmetrical construction relative to the lever 18. Each tensioning lever 18, 19 includes a rectangular frame 20 hinged by the hinge pins 21, 21' to the hinge blocks 17', 17" as mentioned above. The hinge blocks 17' and 17" are fixed to the mounting 17 as shown in FIG. 1. The journal bolts 3 and 4 and the hinge pins 21 and 21' extend in parallel to each other and to the longitudinal central axis.

The opposite, free end of each frame 20 of the tensioning levers 18, 19 has a drilling in which a tensioning screw 22 is received. A threaded end of the tensioning screw 22 extends out of the frame 20. The threading is of sufficient length along the tensioning screw to accommodate a tension nut 22 which moves the tensioning screw 22 relative to the frame 20 in an adjusted tensioned position. The inner end of the tensioning screw 22 is rotatably secured and connected by an end thread to a guide block 23 for adjusting the position of the guide block 23 lengthwise within the frame 20 of the tensioning lever 18. The frame 20 has in its upwardly and downwardly facing frame side sections elongated holes 24 through which the journal bolt 3 extends into and through the guide block 23 which is slidable back and forth in the frame 20 in response operating the tensioning screw 22. Further the ends of the journal bolt 3, 4 stick out upwardly and downwardly of the frame 20 into the respective eyes 1' and 2', and 1" and 2", respectively. As seen in FIG. 6 the frame 20 carries a locking bail 25 for locking the tensioning lever 18, 19 in a tensioned position which will be described below. When the tension nut 22' is loosened, the position of the guide block 23 shown in FIG. 4 can be adjusted within the frame 20 to tension the tensioning members 1 and 2 since the journal pins 3, 4 pass through the guide block 23 and can move back and forth along the elongated guide holes 24 of the frame 20 when the guide block 23 moves back and forth in the frame 20 in response to an adjustment of the screw 22.

As best seen in FIG. 6, the locking bail 25 is constructed for cooperating with a locking bar 26 that is part of the locking mechanism 15, 16. The locking bar 26 is slidably mounted in a support 36 secured to the mounting 17. The sliding motion of the locking bar 26 extends in the direction circumferentially around the clamping mechanism CM. This applies also to a locking bar which cooperates with a respective bail of the tensioning lever 19 not shown in FIG. 4. Both ends of each locking bar 26 extend out of their respective supports which are secured to the mounting 17. Each locking bar has a portion or surface that cooperates with a locking member 28 shown in FIG. 4. A tensioning lever of the locking bar 26 engages the bail 25 for locking the respective lever in a tensioned position with the help of the locking member 28 which functions as a mechanical safety device for locking and unlocking the clamping mechanism CM. The locking member 28 may for example include a wedge that is movable up and down as described in U.S. Pat. No. 6,588,968 B2 which also describes the operation of the clamping mechanism.

Referring further to FIGS. 4 and 6, the locking bar 26 cooperates with the locking member 28 which can be moved up or down for unlocking or locking the locking bar 26 relative to the locking bails 25. The locking member 28 is held in the locked position by a spring pin 38 which passes with one leg through two fixed stops 28' and through the locking member 28 to hold the member, 28 in a locked position. The other leg of the spring pin 38, provides a bias force against an unintended withdrawal of the spring pin 38 from the locking member 28 and from the stops 28'. The stops 28' are screwed to the support 36 or to a support cover 36" by screws 36'.

Referring to FIGS. 4, 5 and 6, according to the invention at least one, preferably two, retarding leaf spring elements 34, 35 are mounted in respective grooves G and held in place by the support cover 36" tied down by the screws 36'. The free ends of the retarding spring elements 34, 35 are so positioned that the respective tensioning lever 18, 19 on its way into a released position will encounter a corresponding retarding element 34, 35. Preferably, the tensioning levers 18, 19 are equipped with contact pins 37 passing through the frame 20 of the respective tensioning lever 18, 19. Each contact pin projects from opposite sides of the respective frame 20 into a position for engagement of the respective retarding spring element 34, 35 when the tensioning lever 18, 19 is on its way into an open or rather released position following an unlocking operation of the member 28 when the spring pin 38 has been removed.

It should be noted, that the retarding leaf spring elements 34, 35 will be installed after the tensioning levers 18, 19 have been tilted into the tensioned, closed position to avoid interference with the closing or tensioning motion of the levers 18, 19. When the levers 18, 19 have been closed and locked the elements 34, 35 are simply inserted into the grooves G and the cover 36" is screwed down by tightening the screws 36'.

FIGS. 4 and 5 show the present system after the tensioning levers 18, 19 have been rotated into the tensioned and locked position and after the retarding leaf spring elements 34, 35 have been installed as described above. The motion of the tensioning levers 18, 19 into the tensioned and locked position causes the tensioning members 1, 2 to move the clamping elements 5 radially inwardly. This rotating motion of the levers 18, 19 about the hinge pins 21 substantially closes the clamping mechanism so that any remaining closing distance is short. Thus, the remaining closing distance that must still be closed or removed for a complete tightening, can be easily removed by operating the adjustment screws 22 by tightening the tension nuts 22' when the clamping mechanism has been completely tightened. In this completely closed position the locking bails 25 are arrested by the respective locking bar 26.

The present clamping mechanism is opened, e.g. when the rocket and payload has reached the predetermined position or orbit by releasing the locking bar 26 as described in more detail in the above mentioned U.S. Pat. No. 6,588,968 B2, for example by an electromagnetic release mechanism which controls the motion of the locking member 28, whereby the dissipation of the energy stored in the clamping mechanism takes place in a controlled and delayed or timed manner.

Figure 7:
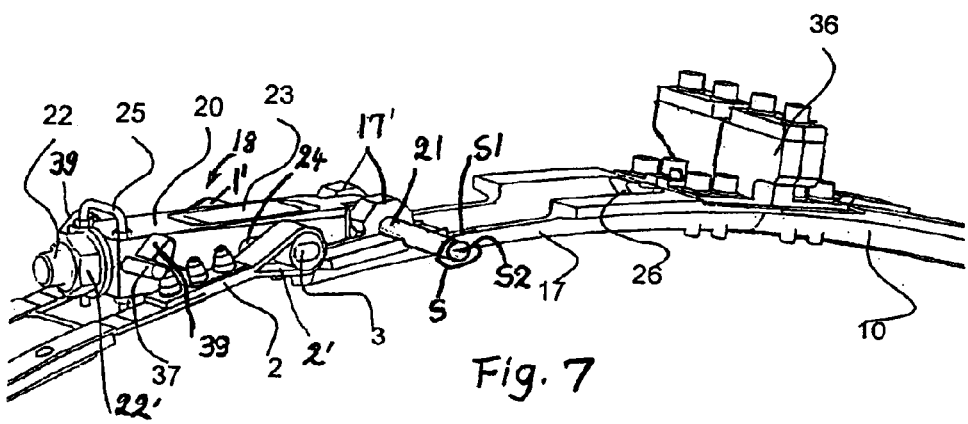
FIG. 7 shows an embodiment similar to that of FIG. 6 but with a spiral spring installed to perform the retarding function.
Figure 8:
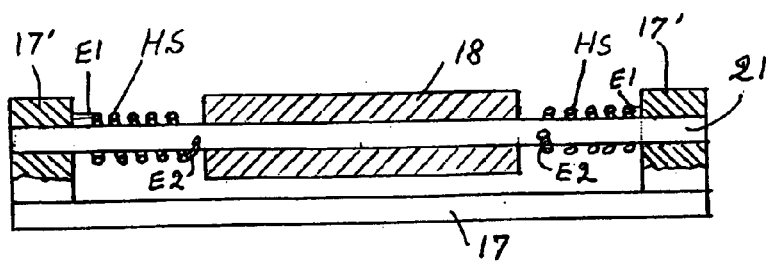
FIG. 8 shows a sectional view through the hinge of a tensioning lever with two helical springs for performing the retarding function.

According to the invention the timed release of the clamping mechanism is further delayed or retarded by the retarding elements shown as leaf springs 34, 35 in FIGS. 4, 5 and 6, and as spiral or helical springs in FIGS. 7 and 8.

FIG. 5 shows the a spacing "b" between the retarding leaf springs 34, 35 and the respective contact pin 37. The retarding or slowing down of the opening motion of the tensioning levers 18, 19 begins as soon as the contact pins 37 bear against the respective retarding leaf spring 34, 35. As the opening motion continues, the pins 37 slide along the leaf springs thereby elastically deforming the springs which generate a counter moment against the opening moment or rather opening torque of the tensioning levers 18, 19 whereby a controlled slowdown of the opening motion is achieved.

The slow down control depends on several factors such as the selection of the spring material of which the leaf springs 34, 35 are made, their modulus of elasticity, their spring constant, the dimensions of the leaf springs, and the selection of an optimal spacing "b". No undue experimentation for the selection of the foregoing factors is involved since the selection will depend on the size of the clamping mechanism and on the intended slow down or duration of the complete opening motion. For example, the stiffer the leaf springs are the longer will be the duration of the opening motion. By selecting an optimal tension release or opening time in combination with an optimal force/time gradient a controlled force dissipation is achieved which minimizes the triggering of vibrations in the components being released from each other. Simultaneously loads on the components to be separated are optimally reduced.

FIG. 7 shows an embodiment of the present invention wherein the leaf springs 34, 35 have been replaced by at least one spiral spring S. One end S1 of the spiral spring S is secured to a fixed point such as the mounting 17. The other end S2 of the spiral spring S is secured to the hinge pin 21. The winding direction of the spiral spring S around the hinge pin 21 is such that the spring S will oppose a rotation of the hinge pin in the opening direction, namely counterclockwise in FIG. 7 as seen by a viewer looking at FIG. 7.

FIG. 8 shows an embodiment with two helical springs HS positioned around the hinge pin 21 for retarding the rotation of the hinge pin 21 and thus of the tensioning lever 18 into its open, tension released position. Only the hinged end of the tensioning lever 18 is shown in section in FIG. 8. One end E1 of each helical spring HS is secured to a fixed point such as the hinge blocks 17'. The other end E2 of the helical spring HS is secured to the hinge pin 21. The winding direction of the helical spring is such that an opening motion of the respective tensioning lever is retarded.

FIGS. 4, 5 and 6 also show snap locks 39 for example in the form of shaped leaf springs secured to the mounting 17 by screws 39' in such a position that the contact pins 37 of the tensioning levers 18, 19 will engage the snap locks 39 when the tensioning levers reach the tension released open position. Thus, the contact pins 37 serve for two purposes. First the contact pins 37 cooperate with the retarding springs 34, 35 and then the pins 37 engage the snap locks 39 to hold the tensioning levers in an open position.

All the advantages outlined in the disclosure of U.S. Pat. No. 6,588,968 B2 are also achieved by the improved clamping mechanism according to the invention. Additionally the invention achieves a positive control of the forces that are released when the present clamping mechanism is opened as outlined above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A clamping mechanism for releasably interconnecting two structural components having radially outwardly reaching clamping surfaces of rotational symmetry, said clamping mechanism comprising a plurality of clamping elements, at least one tensioning member holding said clamping elements together, said clamping elements comprising a radially inwardly facing clamping groove adapted for cooperation with said clamping surfaces of said structural components, said at least one tensioning member comprising a first end and a second end, a first connecting eye secured to said first end of said at least one tensioning member, a second connecting eye secured to said second end of said at least one tensioning member, and at least one tensioning assembly comprising a mounting, first and second tensioning levers and two separate hinges, each separate hinge operatively securing one of said first and second tensioning levers to said mounting for tensioning said at least one tensioning member, a locking mechanism secured to said mounting between said first and second tensioning levers for locking said first and second tensioning levers in a tensioned position, said first tensioning lever comprising a first guide, a first journal bolt securing said first connecting eye to said first tensioning lever in said first guide for movement relative to said first tensioning lever, said second tensioning lever comprising a second guide, a second journal bolt securing said second connecting eye to said second tensioning lever in said second guide for movement relative to said second tensioning lever, and retarding means operatively interposed between said mounting and each tensioning lever of said first and second tensioning levers for slowing down an opening motion of said first and second tensioning levers.

2. The clamping mechanism of claim 1, wherein said retarding means comprise a spring elastic characteristic.

3. The clamping mechanism of claim 1, wherein said retarding means comprise a least one leaf spring (34, 35) and a spring support securing said at least one leaf spring to said mounting, said at least one leaf spring extending into an opening motion path of a respective tensioning lever of said first and second tensioning levers.

4. The clamping mechanism of claim 3, wherein said spring support comprises an open groove for said at least one leaf spring and a removable cover for closing said open groove with said at least one leaf spring held in said groove by said removable cover.

5. The clamping mechanism of claim 4, comprising two leaf springs having a length such that leaf spring ends protrude from opposite sides of said spring support into positions for contacting said spaced first and second tensioning levers when said first and second tensioning levers perform an opening motion.

6. The clamping mechanism of claim 5, wherein said leaf spring ends protruding from opposite sides of said spring support have an initial spacing (b) from said first and second tensioning levers respectively so that said first and second tensioning levers contact said leaf spring ends after said first and second tensioning levers have been released from their closed position and are moving toward an open position.

7. The clamping mechanism of claim 3, comprising two leaf springs for contacting each of said first and second tensioning levers, and contact pins secured to said first and second tensioning levers in positions for engaging said two leaf springs when said tensioning levers are moving toward an open position.

8. The clamping mechanism of claim 7, wherein said contact pins are initially spaced from said leaf springs so that said contact pins contact said leaf springs after said first and second tensioning levers have been released from their closed position.

9. The clamping mechanism of claim 7, wherein said two leaf springs extend in parallel to each other and are spaced from each other, and wherein said contact pins protrude from opposite sides of said first and second tensioning levers.

10. The clamping mechanism of claim 1, wherein said retarding means comprise at least one spiral spring interposed between each of said first and second tensioning levers and said mounting.

11. The clamping mechanism of claim 10, wherein said at least one spiral spring is interposed between said mounting and a respective hinge pin of said two separate hinges.

12. The clamping mechanism of claim 11, wherein said at least one spiral spring is a helical spring surrounding said hinge pin, wherein one end of said helical spring is secured to said hinge pin and another end of said helical spring is secured to said mounting.

13. The clamping mechanism of claim 1, wherein each of said first and second tensioning levers comprises a frame, each of said two separate hinges comprising at least one hinge block and a hinge pin hinging a first end of said frame to said mounting, said frame forming a hollow guide as part of said first and second guides, each-tensioning lever further comprising a guide block displaceable inside said hollow guide, said frame having an internally threaded second end opposite said first end, a clamping screw having an external threading passing through said internal threading of said second frame end, said clamping screw having an inner end connected to said guide block carrying one of said first and second journal bolts respectively, said frame further having at least one elongated open side channel through which said one of said first and second journal bolts extends out of said frame into engagement with said first and second connecting eyes of said at least one tensioning member.

14. The clamping mechanism of claim 1, comprising two tensioning members constructed as tensioning straps or belts extending in parallel to each other.

15. The clamping mechanism of claim 1, comprising two tensioning members, each of said two separate hinges comprising a hinge pin having a journal axis extending in parallel to a longitudinal central axis of said two structural components and in a cylindrical circumferential plane around said longitudinal central axis, said two tensioning members also extending in said cylindrical circumferential plane when said two tensioning members are in their tensioning locked position.

16. The clamping mechanism of claim 1, wherein said at least one tensioning member and said plurality of clamping elements form an uninterrupted ring in a locked closed state and in an unlocked open state of said clamping mechanism.

17. The clamping mechanism of claim 1, further comprising a snap lock secured to said mounting for holding a respective tensioning lever of said first and second tensioning levers in an open tension released position.

18. The clamping mechanism of claim 17, wherein said snap lock comprises a shaped spring secured to said mounting, said first and second tensioning-levers comprising contact pins which engage said retarding means when said tensioning levers move from a tensioned locked position to a tension released position, and wherein said contact pins engage said snap lock when said tensioning levers have reached said tension released position.

* * * * *

UNITED STATES PATENT AND TRADEMARK OFFICE
CERTIFICATE OF CORRECTION

PATENT NO. : 6,981,816 B2  
APPLICATION NO. : 10/717011  
DATED : January 3, 2006  
INVENTOR(S) : Huessler It is certified that error appears in the above-identified patent and that said Letters Patent is hereby corrected as shown below:

Column 6,  
Line 67, after "to" replace "acconunodate" with -- accommodate --;

Column 7,  
Line 1, after "nut" replace "22" by -- 22' --;  
Line 10, after 'response" insert -- to --;

Column 8,  
Line 43, after "shows" delete "the";

Column 10,  
Line 14, after "comprise " replace "a" by -- at --;

Column 11,  
Line 2, after "guides," replace "each-tensioning" by -- each tensioning --;

Column 12,  
Line 14, after "second" replace "tensioning-levers" by -- tensioning levers --.

Signed and Sealed this

Twenty-seventh Day of June, 2006

JON W. DUDAS  
*Director of the United States Patent and Trademark Office*